US006282433B1

(12) United States Patent
Holshouser

(10) Patent No.: US 6,282,433 B1
(45) Date of Patent: Aug. 28, 2001

(54) PERSONAL COMMUNICATION TERMINAL WITH A SLOT ANTENNA

(75) Inventor: Howard E. Holshouser, Efland, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/291,738

(22) Filed: Apr. 14, 1999

(51) Int. Cl.[7] ............................................. H04M 1/00
(52) U.S. Cl. ....................... 455/556; 455/90; 455/272; 455/557; 343/702; 343/746; 343/767
(58) Field of Search .................................. 455/550, 556, 455/557, 90, 272, 132, 41; 343/702, 746, 767, 768, 770, 771

(56) References Cited

U.S. PATENT DOCUMENTS 4,704,581 * 11/1987 Clark ..................................... 343/767

FOREIGN PATENT DOCUMENTS

0851530A2 7/1998 (EP) .
2325091A 5/1998 (GB) .

OTHER PUBLICATIONS

Haartsen, Jaap, "Bluetooth–The Universal Radio Interface for Ad Hoc, Wireless Connectivity," Ericsson Review No. 3, 1998, pp. 110–117.

* cited by examiner

Primary Examiner—Lee Nguyen
(74) Attorney, Agent, or Firm—Coats & Bennett

(57) ABSTRACT

A personal communications terminal includes a telephone unit and an application processing unit that are operatively connected. The telephone unit includes a first RF transceiver for communicating with a cellular communications network via an external dipole antenna. The application processing unit includes a short range transceiver and antenna for connecting the computing device with an external computer or local area network. The short range antenna is a slot antenna formed by a slot in the housing of the personal communications terminal.

16 Claims, 7 Drawing Sheets

PERSONAL COMMUNICATION TERMINAL WITH A SLOT ANTENNA

FIELD OF THE INVENTION

The present invention relates generally to antennas for mobile communication devices, such as cellular telephones, and more particularly to a slot antenna for a mobile communications device to allow the mobile communications device to communicate via an RF link with a local area network or computer.

BACKGROUND OF THE INVENTION

Personal communication terminals (PCTs), sometimes referred to as personal digital assistants (PDAs), combine a small, hand-held computer with a cellular telephone. A personal communications terminal can be used to run applications, retrieve and read e-mail, and browse the internet. Also, the PCT can be used as a standard cellular telephone for communication in a cellular network. Such devices often have infrared communications capability to allow the device to be connected to other computers and printers for transferring files or data between the devices. One drawback to infrared communications is that it requires direct line of sight between the connected devices. This requirement greatly limits the ability to connect to computers that are connected to an existing local area network (LAN) since all obstructions in the direct line of sight between the connected devices must be removed.

It is also known to use a low-power short-range radio transceiver to provide an RF link with an existing computer or LAN. An RF link does not require direct line of sight between the connected devices and is, therefore, more flexible than an infrared link. Such wireless networks are often used for home networks where computers reside in different rooms. One problem with adopting wireless network technology for use in a cellular phone is that two separate antennas are required because the short-range transceiver used for communications with another computer operates in a different frequency band than the cellular phone transceiver. There is also a problem with interference since both transceivers may be active at the same time. Therefore, it is necessary to separate the antennas to avoid interference. This presents a problem in small, hand-held devices, such as PCTs.

SUMMARY OF THE INVENTION

The present invention relates to antenna systems for personal communications terminals (PCT) that combine a cellular telephone and application processing unit (APU). The APU functions as a small, palm top computer that is capable of running application programs, such as a personal information manager, e-mail program, and web browser. The APU includes a mobile computing interface (MCI) module having a short-range RF transceiver for connecting the APU to a nearby computer or local area network.

An external dipole antenna is used for long-range communications with a cellular communication network. The MCI module employs a slot antenna for communications with the external computer. The housing of the PCT is made of a conductive material and serves as the ground plane for the slot antenna. A one-half wave length slot is formed in the housing and functions as the radiating element of the antenna. The MCI module is electrically coupled to the slot antenna. In the preferred embodiment of the invention, the MCI module is inductively coupled to the slot antenna. The MCI module includes a coupling loop that is placed in close proximity to one end of the slot in the housing. During transmission, the voltage signal across the coupling loop is transferred to the slot antenna which, in turn, radiates electromagnetic waves. Similarly, electromagnetic waves acting on the slot antenna will induce a current in the coupling loop during reception of a transmitted signal.

In some embodiments, the PCT also includes an optional infrared module that allows communications between the APU and the nearby computer or local area network via an infrared link. The infrared module is preferably placed behind the slot so that infrared signals transmitted and received by the infrared module pass through this slot. Thus, there is no need to form an additional opening for the infrared link.

DETAILED DESCRIPTION OF THE INVENTION

Figure 1:
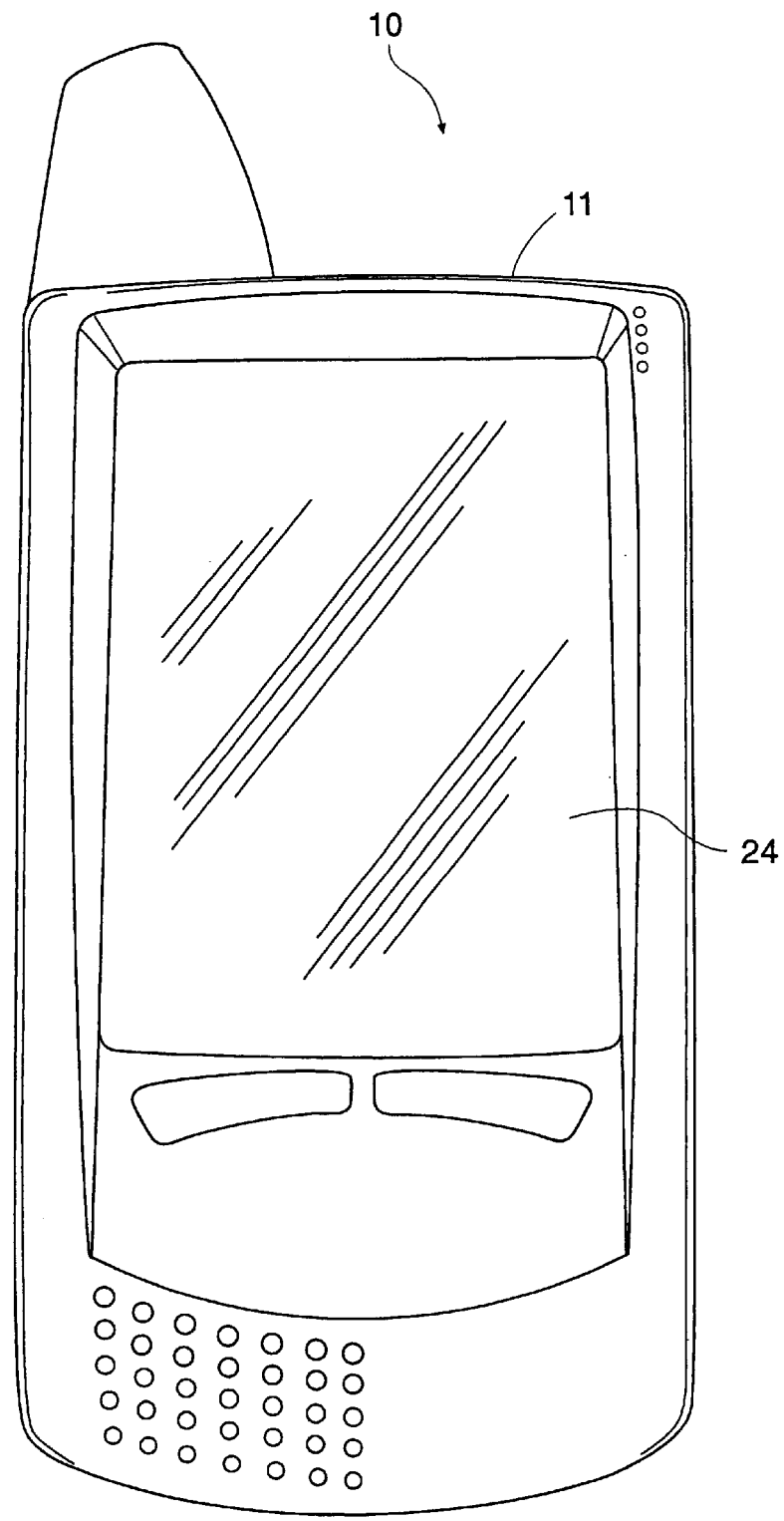
FIG. 1 is a top plan view of a personal communications terminal.
Figure 2:
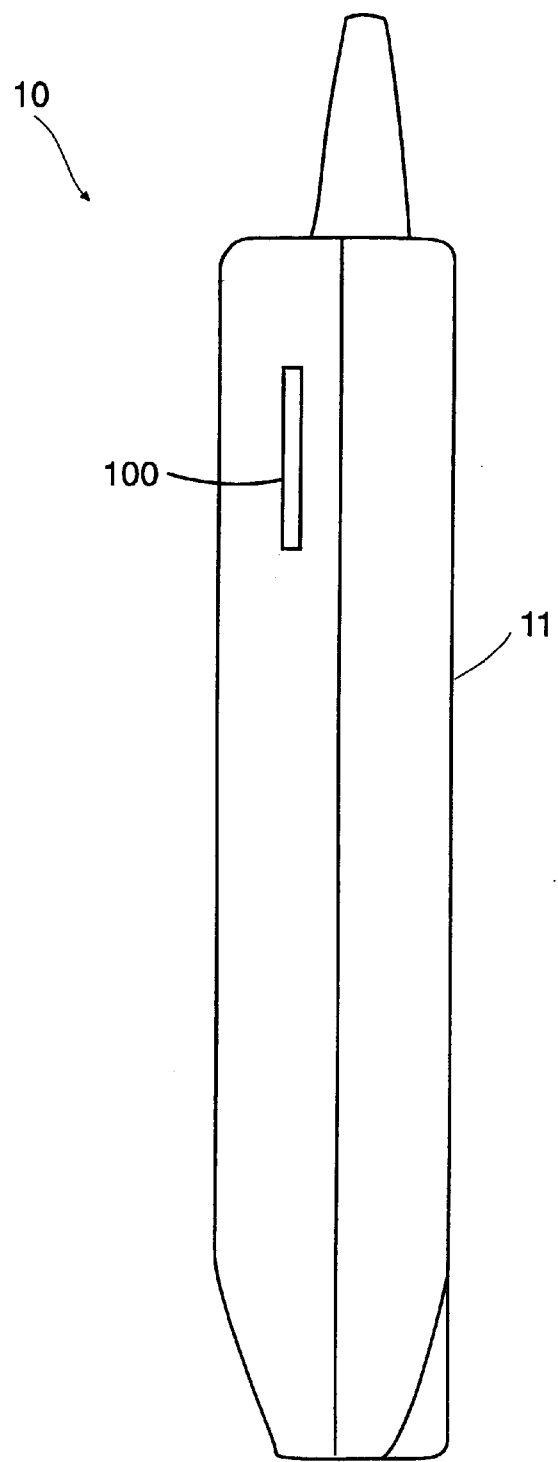
FIG. 2 is a side view of the PCT.
Figure 3:
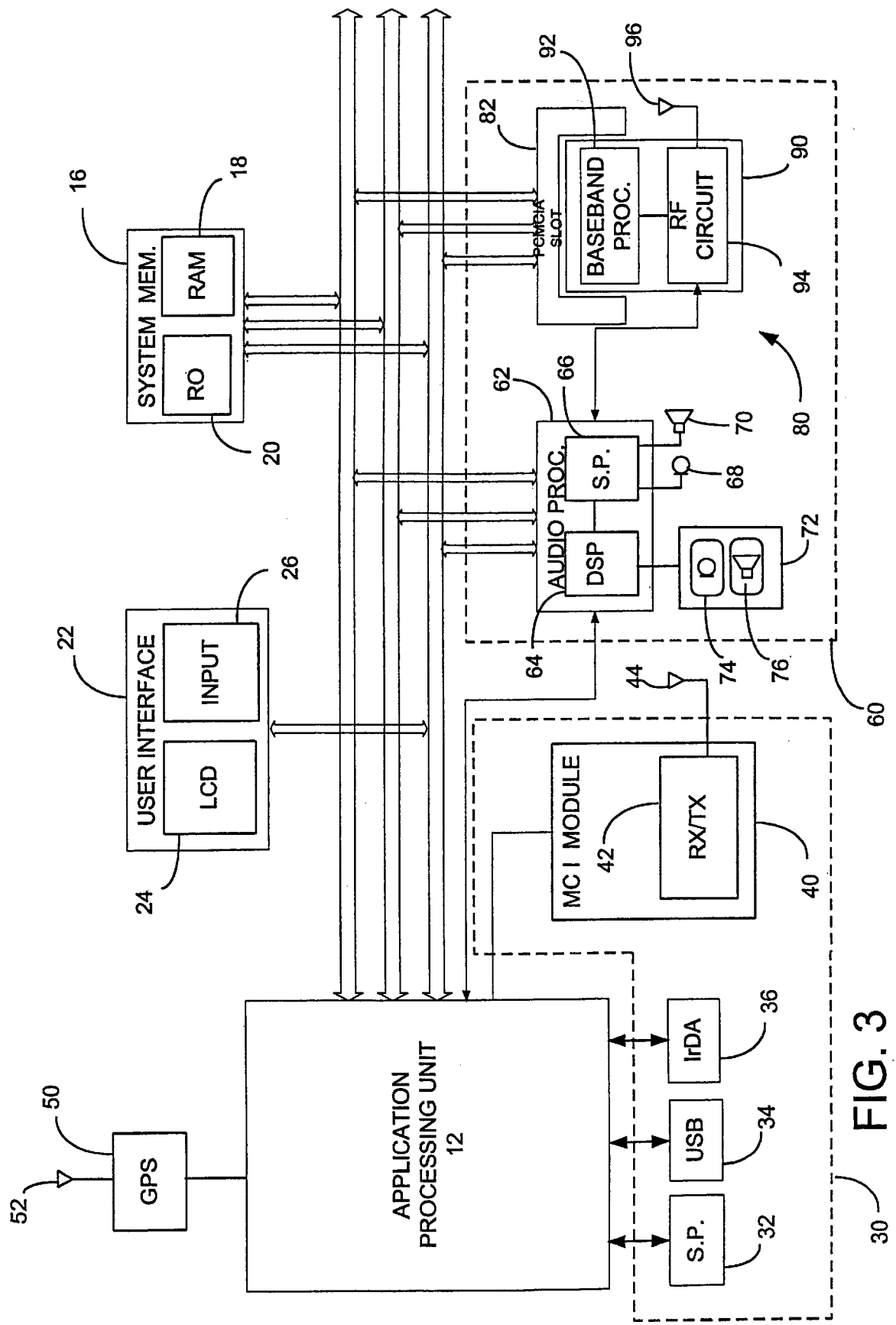
FIG. 3 is a functional block diagram of the PCT.

Referring now to the drawings, and particularly to FIGS. 1 and 2, a personal communications terminal (PCT) made in accordance with the present invention is shown therein and indicated generally by the numeral 10. The personal communications terminal 10 combines a small, hand-held computer with a cellular telephone within a housing 11. FIG. 3 is a functional block diagram of the personal communications terminal 10. The PCT 10 generally includes an application processing unit (APU) 12, system memory 16, user interface 22, system interface 30, and telephone unit 60.

The APU 12 includes one or more processors for controlling the operation of the PCT 10 and running installed software applications. The user interface 22 includes a liquid crystal display (LCD) 24 and user input device 26. The input device 26 may be a keypad or pointing device (such as a mouse, trackball, or touch pad). Information is displayed to the user on the LCD 24. The user interacts with the PCT 10 via the input device 26. The input device 26 may comprise a keypad, buttons, or pointing device, such as a mouse, trackball, light pen, or touchpad. Also, the LCD 24 may be a touch-sensitive LCD on which virtual buttons, menus, virtual keyboards, or other input elements can be displayed to allow the user to enter data, such as contact information, type messages and otherwise enter commands.

The system interface 30 provides means to connect the PCT 10 to external devices. The system interface 30 includes a serial port 32, USB-port 34, infrared module 36, and RF module 40. The serial port 32 enables serial communications with a connected device. The USB-port 34 enables the PCT 10 to communicate with connected devices via a standard USB interface. The infrared module 36 allows communications with a computer or other nearby device via an infrared link.

The mobile computing interface (MCI) module 40 provides a low-power RF link using wireless network technology. MCI module 40 includes a low power radio transceiver 42 and antenna 44 for short-range RF communications with a nearby computer. Typically, the MCI module operates in the unregulated 2.4 GHz band. The MCI module 40 allows the PCT to connect with other computers or to a local area network via RF link. This is particularly useful where direct line of sight between the PCT 10 and the connected device is not possible.

The PCT may also include a GPS receiver 50 that can be used to determine the location of the PCT 10. The GPS receiver 50 includes an antenna 52 to receive GPS signals from a satellite. The signals from the satellite are used to calculate the position of the PCT 10.

The telephone unit 60 functions as a conventional cellular phone. The telephone unit 60 includes audio processing circuits 62 and transceiver unit 80. The transceiver unit 80 is a conventional cellular phone transceiver that communicates over a cellular network according to known standards, such as IS-54 and IS-136. The transceiver unit 80 typically operates in the 900 MHz and/or 1800 MHz bands used for cellular communication.

The audio processing circuits 62 process audio signals transmitted and received by the telephone unit 60. The audio processing circuits 62 includes a digital signal processor 64 and audio interface 66. The audio interface 66 includes a built-in microphone 68 and speaker 70. The audio interface 66 also connects to a hands-free unit 72 which includes an external microphone 74 and speaker 76 for hands-free operation. The transceiver unit 80 comprises a radio card 90 that plugs into a standard PCMCIA slot 82. The radio card 90 includes baseband processing circuits 92, RF circuits 94, and a long-range cellular phone antenna 96. The RF circuits 94 include a modulator and RF amplifier for modulating and amplifying signals passed to it by the audio processing circuits 62. The RF circuits also include a receiver/amplifier and demodulator for detecting and demodulating received signals.

In certain modes of operation, both the phone antenna 96 and MC link antenna 44 may be active at the same time. Therefore, the MC link antenna 44 must be separated from the cellular phone antenna 96 to avoid interference, In the present invention, the cellular phone antenna 96 is a conventional rod antenna that extends from the radio card 90. In general, the length of antenna 96 is one-quarter of a wavelength ($\lambda/4$). For the MC link antenna 44, the present invention uses a slot antenna 100, shown in FIGS. 4–8. One advantage of the slot antenna 100, in addition to avoiding interference with the cellular phone antenna 96, is that the slot antenna 100 is inexpensive and does not consume space within the phone. Another advantage is that a slot antenna 100 does not extend out from the housing so that it is not prone to damage and does not create an unsightly appearance.

Figure 9:
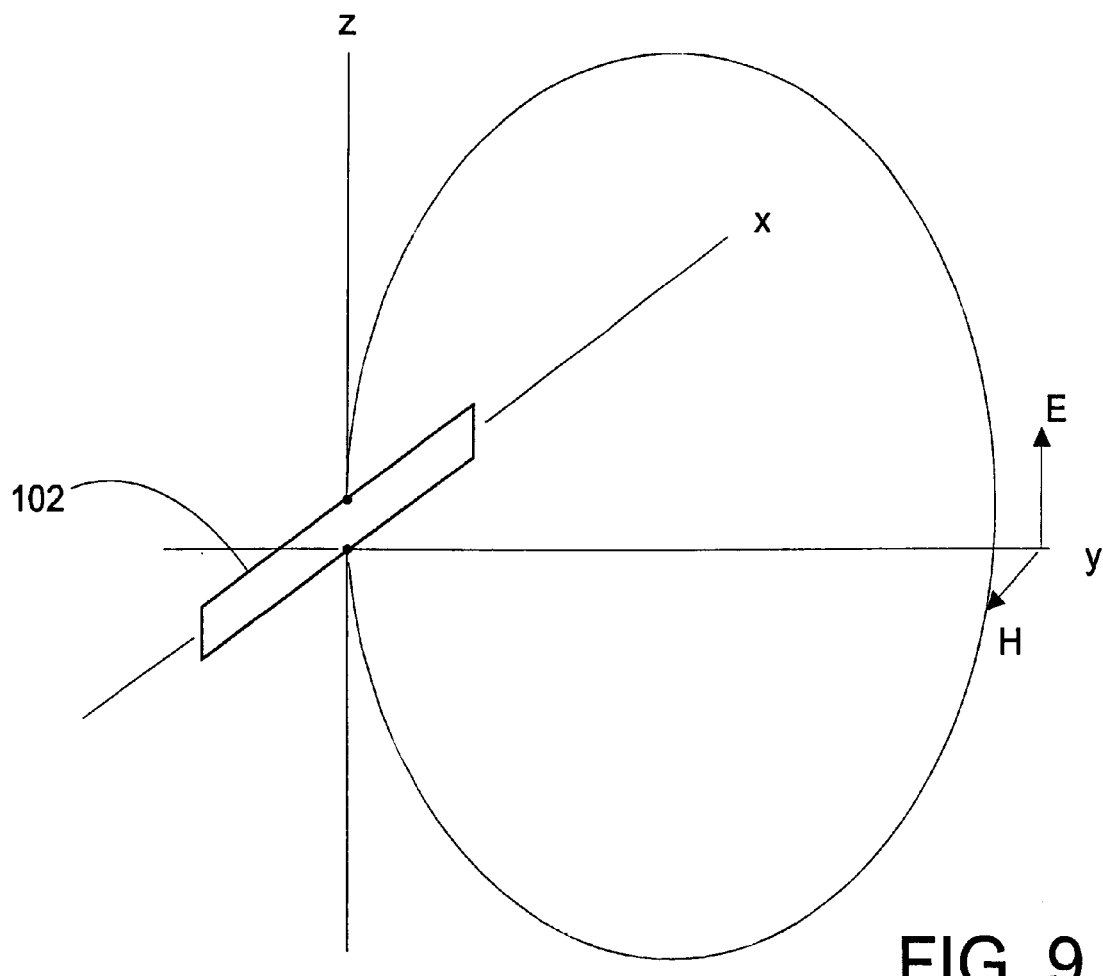
FIG. 9 is a schematic diagram illustrating the radiation pattern of the slot antenna.

FIGS. 4–7 show various configurations of the slot antenna 100. As seen in FIGS. 4–7, a slot 102 is formed in the housing 11 of the personal communications terminal 10. The slot 102 is preferably formed in one of the side walls of the housing 11, although the particular location of the slot 102 is not a critical aspect of the present invention. The slot 102 is preferably $\lambda/2$ in length or more. The housing 11 is constructed of a conductive metal, such as magnesium. Since the housing is conductive, it functions as the ground plane for the slot antenna 100. The voltage signal from the MC link module 40 is fed to opposite sides of the slot 102. When the voltage signal is applied across the slot 102, the slot antenna 100 radiates electromagnetic waves. The radiation normal to the ground plane when the slot 102 is horizontally oriented is vertically polarized. Conversely, the radiation normal to the ground plane when the slot 102 is vertically oriented is horizontally polarized. Normally, a slot antenna 100 in a flat sheet radiates equally on both sides of the sheet. However, the housing forms a cavity behind the slot 102 causing the slot 102 to radiate primarily from the outer side. The radiation pattern has the same shape as a complementary dipole, but with the E and H fields interchanged as shown in FIG. 9.

Figure 4:
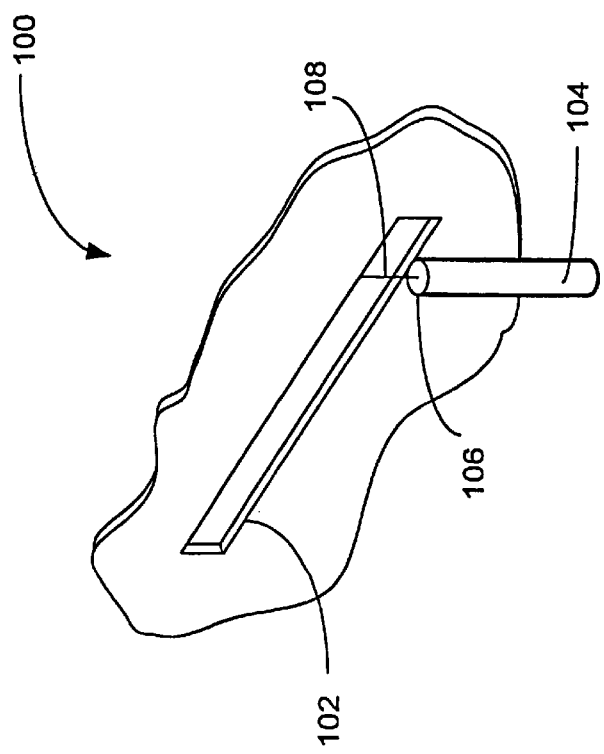
FIG. 4 is a schematic illustration of the slot antenna using a direct coaxial feed.

Various methods may be used to feed the voltage signal from the MC link module 40 to the slot antenna 100, as shown in FIGS. 4–7. FIG. 4 shows a direct feed using a coaxial cable 104. The shield 106 of the coaxial cable 104 is attached to one side of the slot 102 and the center conductor 108 of the coaxial cable 104 is secured to the opposite side of the slot 102. If the voltage signal is fed at the center of the slot 102, the terminal resistance of the housing would be large as compared to the characteristic impedance of a coaxial transmission line (typically 50 $\Omega$). Therefore, an off-center feed is used to provide a better impedance match. The impedance may be adjusted by moving the feed point along the length of the slot 102 or by adjusting the dimensions of the slot 102. Typically, a slot 102 would be a half-wave length ($\lambda/2$) long and the feed point would be approximately $\lambda/20$ from one end of the slot 102. For example, a slot 102 in the ground plane would be 6.25 centimeters long for reception of a signal at 2.4 GHz. By loading the slot with dielectric material, the length could be significantly lowered.

Figure 5:
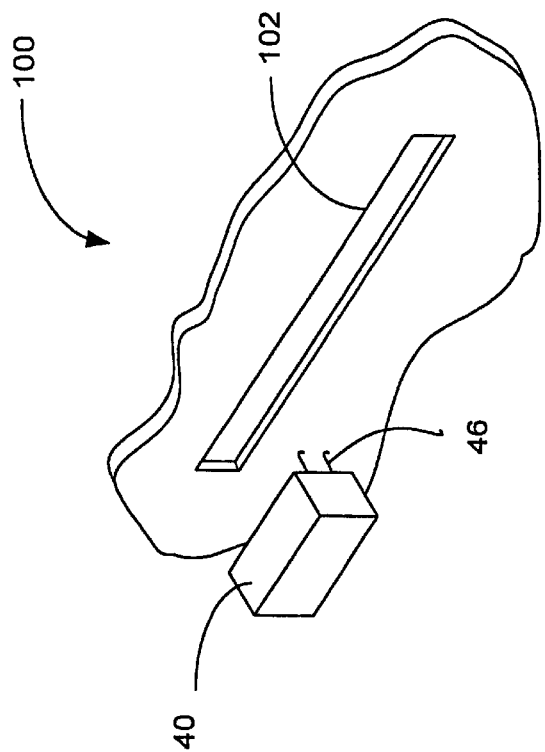
FIG. 5 is a schematic diagram of the slot antenna using a spring contact feed.

FIG. 5 shows an alternate method for feeding the voltage signal to the slot antenna 100. In FIG. 5, the MC link module 40 is positioned in close proximity to one end of the slot 102. A pair of spring contacts 46 extend from the MC link module 40. The spring contacts 46 make contact with opposite sides of the slot 102 to apply the voltage signal to opposing sides of the slot 102. As in the previous embodiment, the feed point is close to one end of the slot 102 for impedance matching.

Figure 6:
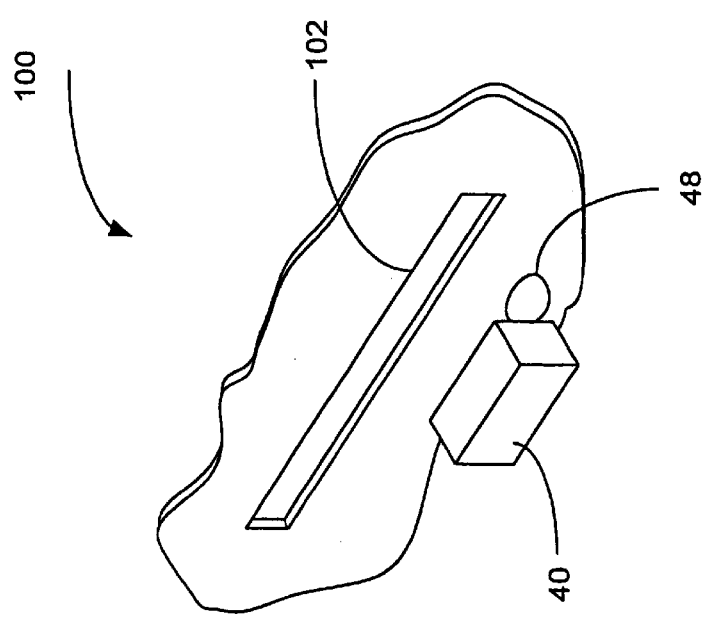
FIG. 6 is a schematic diagram of the slot antenna using an inductive feed.

FIG. 6 shows another method for feeding the voltage signal without physical contact between the MC link module 40 and slot 102. As shown in FIG. 6, the MC link module 40 includes a coupling loop 48. The coupling loop 48 on the MC link module 40 is inductively coupled to the slot 102 in the housing 11. The voltage across the coupling loop 48 is reproduced across the slot 102 in a manner similar to a transformer. Similarly, when the slot 102 is exposed to electromagnetic radiation, a voltage signal will appear across the coupling loop 48. An advantage of using a coupling loop 48 is that it requires no physical contact with the slot 102 and yet provides very good impedance-matching characteristics. For this reason, the coupling loop 48 is simpler and less expensive to manufacture than a direct feed using a coaxial cable 104.

Figure 7:
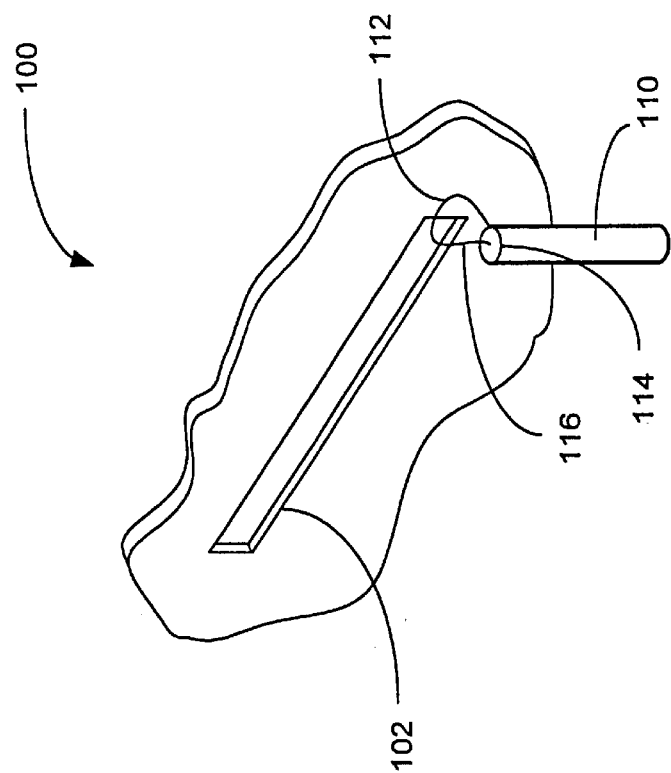
FIG. 7 is a schematic diagram of the slot antenna using an inductive feed in combination with a coaxial transmission line.
Figure 8:
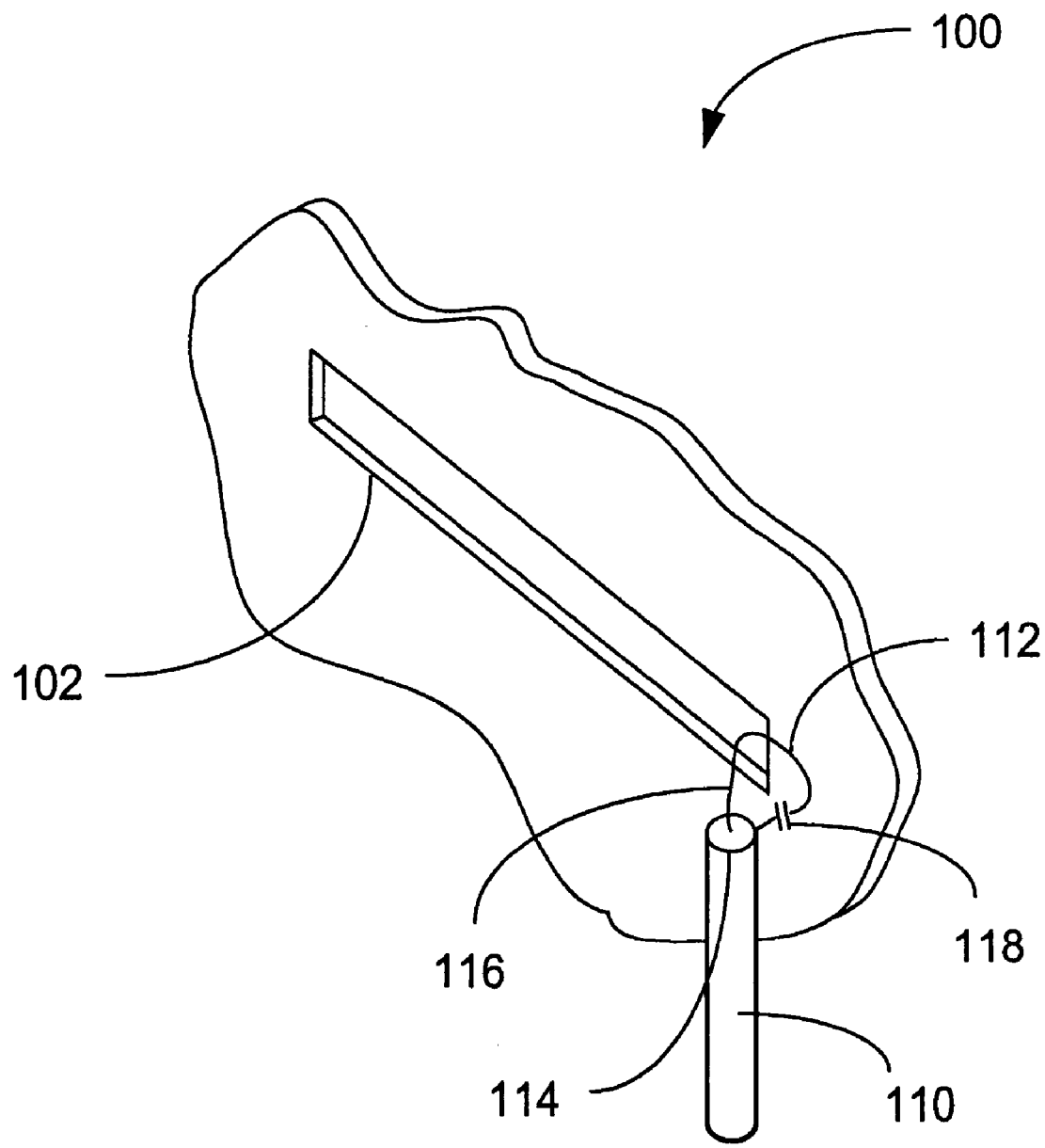
FIG. 8 is a schematic diagram of the slot antenna using an inductive feed with a tuning capacitor.

FIG. 7 shows a variation of the inductive coupling described above. In this embodiment, a coupling loop 112 is formed at the end of a coaxial transmission line 110. As seen in FIG. 7, the center conductor 114 of the coaxial cable 110 is formed into a loop 112 and electrically connected to the shield 116 of the cable 110. The coupling loop 112 thus formed is placed in close proximity to the slot 102 without making electrical contact with the housing. To prevent contact, the coupling loop 112 may be covered with a dielectric material or may be spaced a safe distance from the slot 102. In cases where very high return loss (low VSWR) is desired, a capacitor 118 may be placed in series with the coupling loop 112 so that the inductive reactance of the loop 112 is tuned out, as shown in FIG. 8.

The impedance of the slot antenna 100 can be matched by adjusting the location of the feed point along the length of the slot 102 or by adjusting the dimensions of the slot 102. Typically, a slot would be a half-wave length long. For example, a slot antenna 100 used for reception of a signal at 2.4 GHz would be approximately 6.25 centimeters in length. The slot 102 can be filled with a dielectric material, such as an epoxy, so that the slot 102 is not visible to the user. However, in the preferred embodiment of the invention, the slot 102 is not completely filled. Instead, the slot 102 is used for infrared communications, in addition to its use as the MCI antenna 44. The infrared module 36 is placed behind the slot 102 so that infrared signals pass through the slot 102. Using the slot 102 for both infrared and RF communications avoids the need to provide a separate opening for infrared communications.

The slot antenna 100 of the present invention, in addition to avoiding interference with the cellular phone antenna 96, provides an efficient antenna with good impedance-matching characteristics. The antenna 100 is inexpensive to manufacture and is not prone to damage. Also, the antenna 100 is attractive from a consumer's standpoint since multiple external antennas are not required.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

It is claimed that:

1. A personal communications terminal comprising:
  a) a housing made of a conductive material;
  b) a telephone unit including a long-range RF transceiver for communicating with a cellular network;
  c) a long-range antenna coupled to said long-range RF transceiver for transmitting and receiving RF signals;
  d) an application processing unit operatively connected with the telephone unit for running application programs;
  e) a wireless network interface operatively connected to said application processing unit including a short-range RF transceiver for wireless communication with a nearby computing device; and
  f) a short-range antenna coupled to said short-range RF transceiver for transmitting signals to, and receiving signals from, said nearby computing device, said short-range antenna comprising a slot antenna formed by a slot in said conductive housing of said personal communications terminal so that said housing functions as a ground plane for said slot antenna.

2. The personal communications terminal according to claim 1 wherein said short-range RF transceiver is coupled to said short-range antenna by a coaxial transmission line.

3. The personal communications terminal according to claim 2 wherein said coaxial transmission line is conductively coupled to said short-range antenna.

4. The personal communications terminal according to claim 2 wherein said coaxial transmission line terminates in a coupling loop and is inductively coupled to said short-range antenna.

5. The personal communications terminal according to claim 1 wherein said short-range RF transceiver is inductively coupled to said short-range antenna by means of a coupling loop placed sufficiently close to said slot so that electrical signals are transferred from said coupling loop to said short-range antenna.

6. The personal communications terminal according to claim 1 further including a pair of spring contacts associated with said short-range RF transceiver for coupling to said short-range antenna.

7. The personal communications terminal according to claim 1 further including an infrared module disposed within said housing for infrared communications with said local computing device.

8. The personal communications terminal according to claim 7 wherein said infrared module is positioned behind and aligned with said slot so that infrared signals transmitted and received by said infrared module pass through said slot.

9. A personal communications terminal comprising:
  a) a housing made of a conductive material;
  b) an electronic circuit contained in said housing, said electronic circuit including a short-range RF transceiver for wireless communication with a nearby computing device;
  c) a short-range antenna coupled to said short-range RF transceiver for transmitting signals to and receiving signals from said nearby computing device, said short-range antenna including a slot formed in said conductive housing of said personal communications terminal; and
  d) an infrared module disposed within said housing forming an infrared link between said electronic circuit and said nearby computing device, said module being positioned within said housing so that infrared signals transmitted and received by said infrared module pass through said slot.

10. The personal communications terminal according to claim 9 wherein said short-range RF transceiver is coupled to said short-range antenna by a coaxial transmission line.

11. The personal communications terminal according to claim 10 wherein said coaxial transmission line is conductively coupled to said short-range antenna.

12. The personal communications terminal according to claim 10 wherein said coaxial transmission line terminates in a coupling loop and is inductively coupled to said short-range antenna.

13. The personal communications terminal according to claim 9 wherein said short-range RF transceiver is inductively coupled to said short-range antenna by means of a coupling loop placed sufficiently close to said slot so that voltage signals present across said coupling loop are transferred to said short-range antenna.

14. The personal communications terminal according to claim 9 further including a pair of spring contacts associated with said short-range RF transceiver for coupling to said short-range antenna.

15. The personal communications terminal according to claim 9 wherein said electronic circuit is an RF telephone including a long-range RF transceiver for communicating with a cellular communications network.

16. The personal communications terminal according to claim 9 wherein said electronic circuit is a computer.

* * * * *